United States Patent
Dobkins et al.

(10) Patent No.: US 10,323,471 B2
(45) Date of Patent: Jun. 18, 2019

(54) INTELLIGENT INJECTOR CONTROL SYSTEM, COILED TUBING UNIT HAVING THE SAME, AND METHOD

(71) Applicants: Ken P. Dobkins, Conroe, TX (US); Bo Wu, Spring, TX (US); Stuart J. Murphy, Spring, TX (US); Timothy T. Ramsey, Spring, TX (US); Jeyhun Y. Najafov, Calgary (CA); Thomas T. Watkins, Calgary (CA); William A. Aitken, Calgary (CA); William B. Oliver, Calgary (CA)

(72) Inventors: Ken P. Dobkins, Conroe, TX (US); Bo Wu, Spring, TX (US); Stuart J. Murphy, Spring, TX (US); Timothy T. Ramsey, Spring, TX (US); Jeyhun Y. Najafov, Calgary (CA); Thomas T. Watkins, Calgary (CA); William A. Aitken, Calgary (CA); William B. Oliver, Calgary (CA)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 555 days.

(21) Appl. No.: 15/067,828

(22) Filed: Mar. 11, 2016

(65) Prior Publication Data
US 2017/0260817 A1 Sep. 14, 2017

(51) Int. Cl.
*E21B 19/08* (2006.01)
*E21B 19/22* (2006.01)
(Continued)

(52) U.S. Cl.
CPC .............. *E21B 19/08* (2013.01); *E21B 19/22* (2013.01); *E21B 23/14* (2013.01); *G05B 19/056* (2013.01);
(Continued)

(58) Field of Classification Search
CPC ........ E21B 19/08; E21B 19/086; E21B 19/22; E21B 41/0092; E21B 44/02; E21B 44/06;
(Continued)

(56) References Cited

U.S. PATENT DOCUMENTS 5,850,874 A * 12/1998 Burge .................... B65H 75/22
166/77.3
6,082,454 A 7/2000 Tubel
(Continued)

FOREIGN PATENT DOCUMENTS

WO WO-2015017835 A2 * 2/2015 ............. E21B 44/02

OTHER PUBLICATIONS

Baker Hughes Incorporated, Written Opinion (PCT/ISA/237) for PCT/US2017/021336, Jun. 15, 2017, 9 pages (Year: 2017).*
(Continued)

*Primary Examiner* — Jennifer H Gay
(74) *Attorney, Agent, or Firm* — Cantor Colburn LLP (57) ABSTRACT

An injector control system for a coiled tubing unit includes a programmable logic controller arranged to receive a signal related to sensed parameters of a coiled tubing injection operation; a traction pressure control hydraulic circuit operable to adjust hydraulic pressure provided to at least one traction cylinder in a coiled tubing injection head; a motor pressure control hydraulic circuit operable to adjust hydraulic pressure provided to at least one motor of the coiled tubing injection head; and at least one of the traction pressure control hydraulic circuit and the motor pressure control hydraulic circuit including a proportional control valve in receipt of a variable electrical signal from the programmable logic controller. The programmable logic controller adjusts the signal delivered to the proportional control valve throughout the coiled tubing injection operation as dictated by the sensed parameters.

17 Claims, 5 Drawing Sheets

(51) Int. Cl.
  *E21B 23/14* (2006.01)
  *G05B 19/05* (2006.01)
(52) U.S. Cl.
  CPC .............. *G05B 2219/13004* (2013.01); *G05B 2219/41303* (2013.01)
(58) Field of Classification Search
  CPC ........ G05B 19/056; G05B 2219/13004; G05B 2219/41303
  See application file for complete search history.

(56) References Cited

U.S. PATENT DOCUMENTS

| | | | | |
|---|---|---|---|---|
| 6,142,406 | A * | 11/2000 | Newman | B21C 47/18 166/77.2 |
| 6,192,983 | B1 | 2/2001 | Neuroth et al. | |
| 6,347,664 | B1 | 2/2002 | Perio, Jr. | |
| 7,051,814 | B2 * | 5/2006 | Goode | E21B 7/124 166/339 |
| 7,165,619 | B2 * | 1/2007 | Fox | E21B 7/124 166/343 |
| 7,284,618 | B2 * | 10/2007 | Geddes | B65H 75/4413 166/384 |
| 7,878,247 | B2 | 2/2011 | Misselbrook et al. | |
| 8,720,582 | B2 | 5/2014 | Portman et al. | |
| 9,074,432 | B1 * | 7/2015 | Crosby | E21B 33/068 |
| 9,091,129 | B2 * | 7/2015 | Lancaster | E21B 19/22 |
| 9,151,123 | B2 * | 10/2015 | Portman | E21B 19/22 |
| 9,581,009 | B2 * | 2/2017 | Steffenhagen | E21B 17/20 |
| 9,745,814 | B2 * | 8/2017 | Layden | E21B 29/06 |
| 10,024,123 | B2 * | 7/2018 | Steffenhagen | E21B 44/02 |
| 2003/0178200 | A1 * | 9/2003 | Fox | E21B 7/124 166/341 |
| 2004/0094306 | A1 * | 5/2004 | Goode | E21B 7/124 166/339 |
| 2005/0247455 | A1 * | 11/2005 | Domann | B66D 3/003 166/384 |
| 2006/0163415 | A1 * | 7/2006 | Geddes | B65H 75/4413 242/563 |
| 2009/0308603 | A1 * | 12/2009 | Borgstadt | B25J 9/1664 166/250.15 |
| 2011/0153296 | A1 | 6/2011 | Sadlier et al. | |
| 2012/0248078 | A1 * | 10/2012 | Zediker | E21B 7/14 219/121.67 |
| 2013/0048270 | A1 | 2/2013 | Havinga et al. | |
| 2013/0213641 | A1 * | 8/2013 | Layden | E21B 29/06 166/250.01 |
| 2014/0216752 | A1 * | 8/2014 | Portman | E21B 19/22 166/352 |
| 2015/0101799 | A1 * | 4/2015 | Steffenhagen | E21B 17/20 166/250.01 |
| 2015/0144331 | A1 | 5/2015 | Livescu et al. | |
| 2016/0076372 | A1 * | 3/2016 | Kallis | F01B 3/0055 91/6.5 |
| 2016/0186509 | A1 * | 6/2016 | Steffenhagen | E21B 19/22 166/53 |
| 2017/0260817 | A1 * | 9/2017 | Dobkins | E21B 19/08 |
| 2018/0030792 | A1 * | 2/2018 | Witte | E21B 19/08 |
| 2018/0266234 | A1 * | 9/2018 | Witte | E21B 44/02 |

OTHER PUBLICATIONS

"Coiled Tubing Surface Equipment", www.boti.oil-gov-iq, 10 pages.
Baker Hughes Incorporated, "CIRCA Real-Time Modeling Software, Optimize coiled tubing jobs in real time for safe, efficient, reliable operations", bakerhughes. com, Mar. 2015, 1 Page.
Baker Hughes Incorporated, "TeleCoil Intelligent Coiled Tubing Service, Accelerate recovery by maximizing CT operations", bakerhughes. com, 2014, 2 Pages.
Baker Hughes Incorporated, "CIRCA Coiled Tubing Simulation Software", Mar. 2014, bakerhughes. com, 2 Pages.
Liu, et al., "Monitoring and Managing Coiled Tubing Integrity", Oilfield Review, 2015, vol. 27, Issue 1, 9 pages.
Patton, Bart;"A Built for Purpose Micro-Hole Coiled Tubing Rig" (MCTR); Final Report; 2007; 98 Pages.
PetroWiki, "Tubing injector for CT unit", 2016, petrowiki.org, 4 pages.
Schlumberger, "CoilCat—Coiled tubing computer-aided treatment", slb.com, 2014, 1 page.
Trinkel, Bud; "Infinitely Variable Directional Valves", Hydralics & Pneumatics, Chapter 12, 2007, 5 pages.

* cited by examiner

INTELLIGENT INJECTOR CONTROL SYSTEM, COILED TUBING UNIT HAVING THE SAME, AND METHOD

BACKGROUND

In the drilling and completion industry, the formation of boreholes for the purpose of production or injection of fluid is common. The boreholes are used for exploration or extraction of natural resources such as hydrocarbons, oil, gas, water and alternatively for $CO_2$ sequestration. Coiled tubing is sometimes used for interventions, completion and/or production strings to control and/or provide a conduit for fluid flow to and/or from the surface or to provide operations similar to wirelining. Coiled tubing is thus useful in many well operations including circulation, pumping, drilling, logging, perforating, and production. Coiled tubing is transported to a well site on spools or reels. An injector head system provides for the deployment and retrieval of the spooled coiled tubing strings.

The art would be receptive to methods and apparatus to protect coiled tubing from damage.

BRIEF DESCRIPTION

An injector control system for a coiled tubing unit includes a programmable logic controller arranged to receive a signal related to sensed parameters of a coiled tubing injection operation; a traction pressure control hydraulic circuit operable to adjust hydraulic pressure provided to at least one traction cylinder in a coiled tubing injection head; a motor pressure control hydraulic circuit operable to adjust hydraulic pressure provided to at least one motor of the coiled tubing injection head; and at least one of the traction pressure control hydraulic circuit and the motor pressure control hydraulic circuit including a proportional control valve in receipt of a variable electrical signal from the programmable logic controller. The programmable logic controller adjusts the signal delivered to the proportional control valve throughout the coiled tubing injection operation as dictated by the sensed parameters.

A coiled tubing including the injector control system further includes the coiled tubing unit injection head having the at least one traction cylinder and the at least one motor, and further includes a control cabin housing the programmable logic controller, the traction control hydraulic circuit, and the motor pressure control hydraulic circuit.

A method of adjusting hydraulic pressure delivered to an injection head of a coiled tubing unit is provided where the coiled tubing unit includes a traction pressure control hydraulic circuit operable to adjust hydraulic pressure provided to at least one traction cylinder in the injection head, and a motor pressure control hydraulic circuit operable to adjust hydraulic pressure provided to at least one motor of the injection head. The method includes providing sensed parameters of a coiled tubing injection operation to a computer; sending a computed signal based on the sensed parameters from the computer to a programmable logic controller; and, varying a signal from the programmable logic controller to a proportional control valve in at least one of the traction pressure control hydraulic circuit and the motor pressure control hydraulic circuit based on the computed signal from the computer. Hydraulic pressure to the injection head is adjusted substantially continuously during the coiled tubing unit injection operation by at least one of the traction pressure control hydraulic circuit and the motor pressure control hydraulic circuit.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
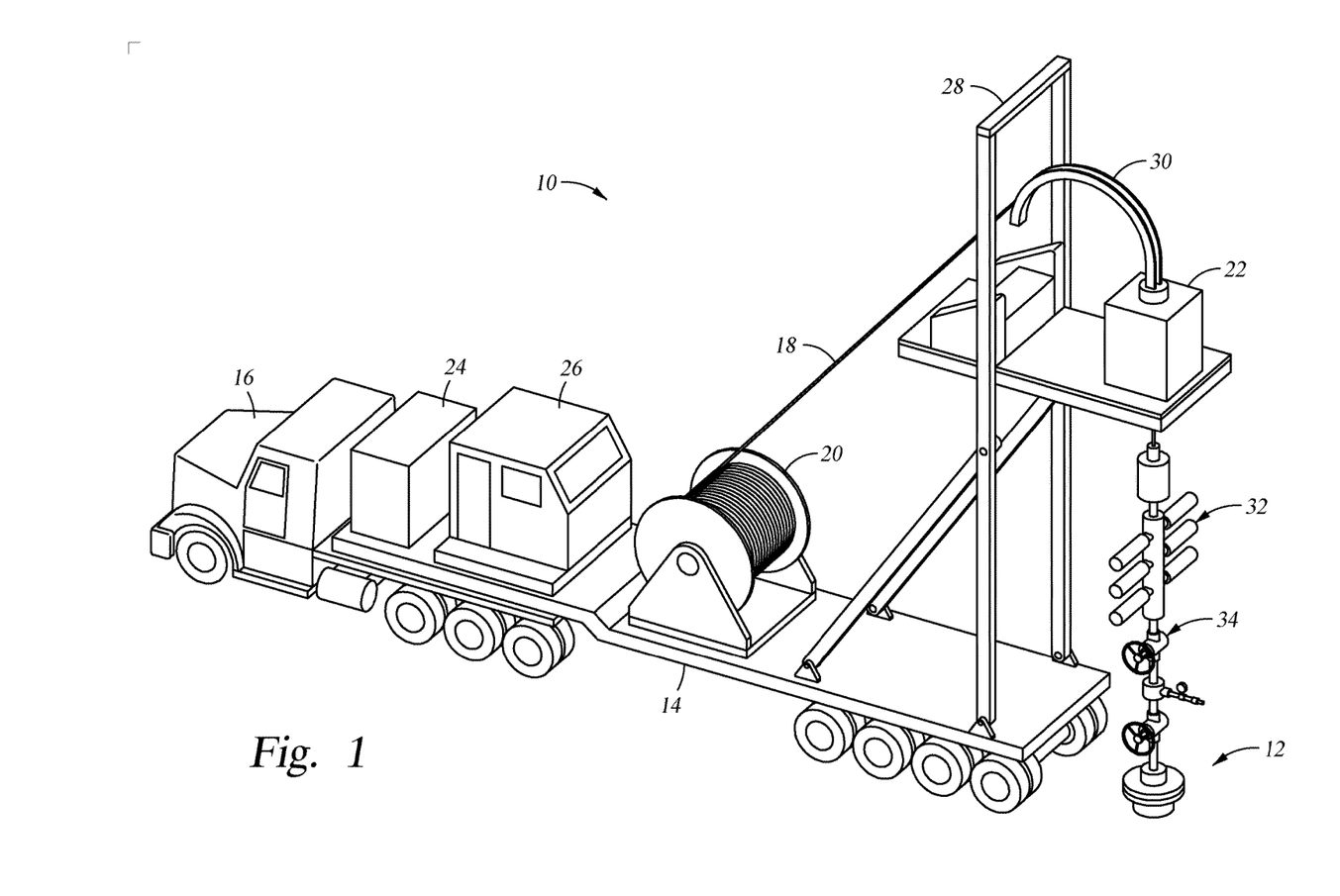
FIG. 1 depicts a side perspective view of an embodiment of a coiled tubing unit in operations at a well site.

FIG. 1 shows one embodiment of a coiled tubing unit 10 for a coiled tubing injection operation at a well site 12. The coiled tubing unit 10 may be trailer mounted upon a trailer bed 14 (or flat car) for transportability, and movable by truck 16, or alternatively by train. In another embodiment, the coiled tubing unit 10 may be provided on an offshore ship or floating rig site, or directly at the surface of the wellsite 12. Coiled tubing 18 is spooled on reel 20, disposed on the trailer bed 14, and deliverable to the site 12 by the truck 16. A coiled tubing injector head 22 is arranged to inject the coiled tubing 18 into a borehole that extends downhole from the surface of the wellsite 12. The injector head 22 is also able to remove the coiled tubing 18 from the borehole. The coiled tubing unit 10 includes a power pack 24, a control cabin 26, the tubing reel 20, support frame 28, gooseneck tubing guide 30, and the injector head 22. The power pack 24 may be a skid that includes the hydraulic pumps and return tank(s) for the injector head 22 as well as the injector directional control system. The control cabin 26 includes at least portions of an intelligent injector control system (as will be further described below), computer, console, seating, monitors, and controls. The support frame 28 supports the injector head 22 at the well site 12, while the gooseneck tubing guide 30 provides the proper radius of curvature and support for the coiled tubing 18 to be spooled off the reel 20 and through the injector head 22. The coiled tubing 18 from the reel 20 is delivered through a blowout preventer stack 32 and wellhead equipment 34 to be pushed into (or pulled from) the borehole (or casing or other tubular within the borehole) by the injector head 22.

Figure 2:
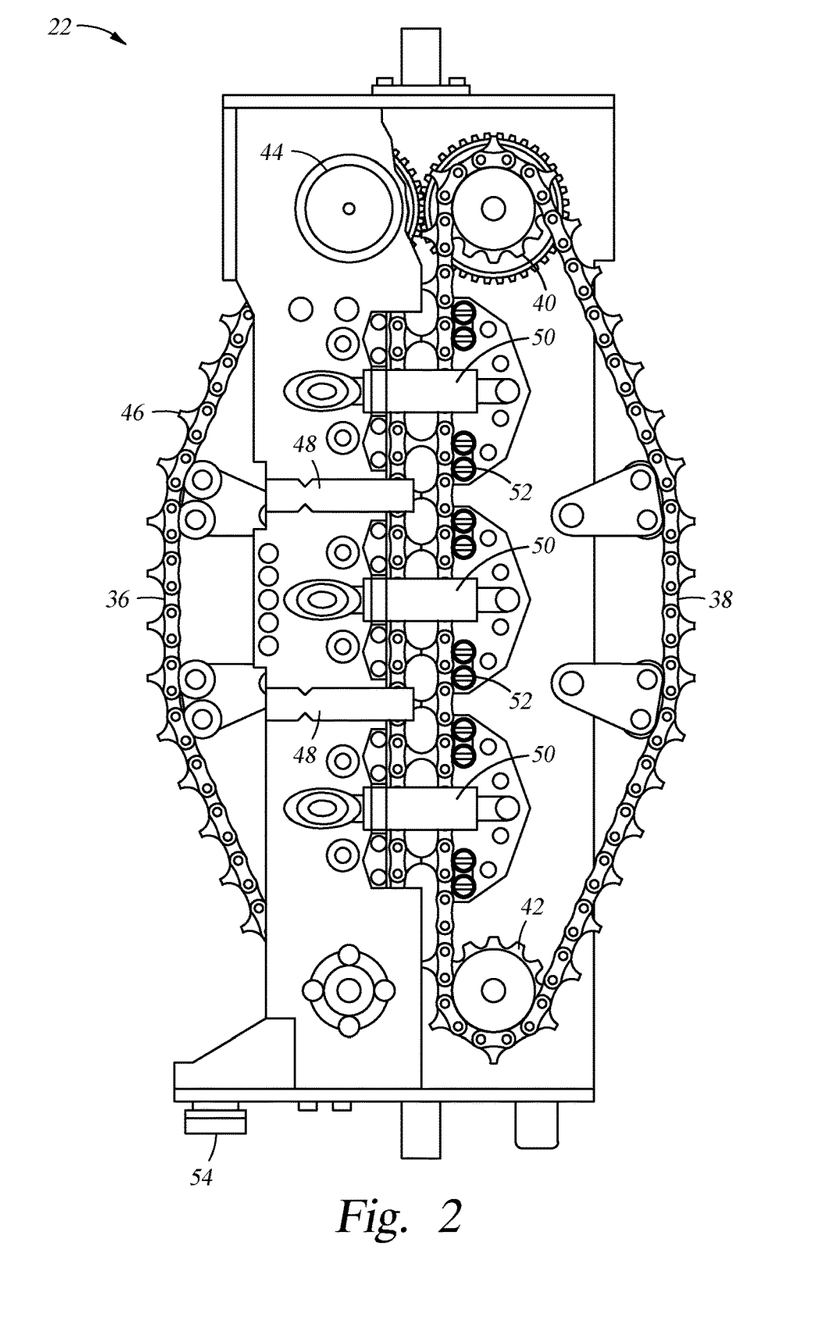
FIG. 2 depicts a side and partial cut-away view of an embodiment of an injector head for the coiled tubing unit of FIG. 1.

One embodiment of the injector head 22 is shown in FIG. 2. The injector head 22 includes, in one embodiment, a pair of looped endless drive chains 36, 38. Each chain 36, 38 is wrapped around a first sprocket 40 and a second sprocket 42, and at least one of these sprockets, such as the first sprockets 40, is driven by one or more hydraulic motors 44, so that these sprockets are drive sprockets 40. Motors 44 are in the injector head 22. Typically there are multiple motors 44, such as two motors 44, however smaller injector heads may have only one motor 44. The second sprockets 42 are idler sprockets or rollers. The speed and direction in which the drive sprockets 40 are driven is controlled by the one or more hydraulic motors 44. For example, turning the first sprocket 40 for a first drive chain 36 and the first sprocket 40 for a second drive chain 38 in opposing first and second rotational directions, respectively, will push the coiled tubing 18 (see FIG. 1) into the borehole, while turning the first sprocket 40 for the first drive chain 36 and the first sprocket 40 for the second drive chain 38 in opposing second and first rotational directions, respectively, will pull the coiled tubing 18 from the borehole. While the time to push or pull the coiled tubing 18 from the borehole should be minimized, care must be taken to ensure that the coiled tubing 18 is not damaged during either process. The chains 36, 38 carry a plurality of gripper blocks 46 that are pressed against and grab generally opposed sides of the coiled tubing 18. Tension cylinders 48 may be positioned to adjust the tension of the chains 36, 38 about the sprockets 40, 42. Hydraulically controlled traction cylinders 50 are arranged to provide a varying amount of traction force as needed onto the coiled tubing 18. Generally there are three traction cylinders 50, but larger injector heads 22 could use four or more. When more than three cylinders 50 are required, they can be hydraulically connected in series to one of the first through third cylinders 50 to avoid a modification to the existing control cabin hydraulic circuitry. As the coiled tubing 18 is pushed further into the borehole, for example, a greater amount of traction force is required. The traction cylinders 50 may be operatively connected to bearing skates 52 that transmit an appropriate amount of force to the gripper blocks 46 to in turn transmit an appropriate amount of force to the coiled tubing 18. Thus, the gripping force on the coiled tubing 18 is controlled by the amount of force applied by the traction cylinders 50. The injector head 22 further includes a load cell 54. The load cell 54 provides a signal relative to weight of the coiled tubing 18 that has passed the injector head 22.

Figure 3:
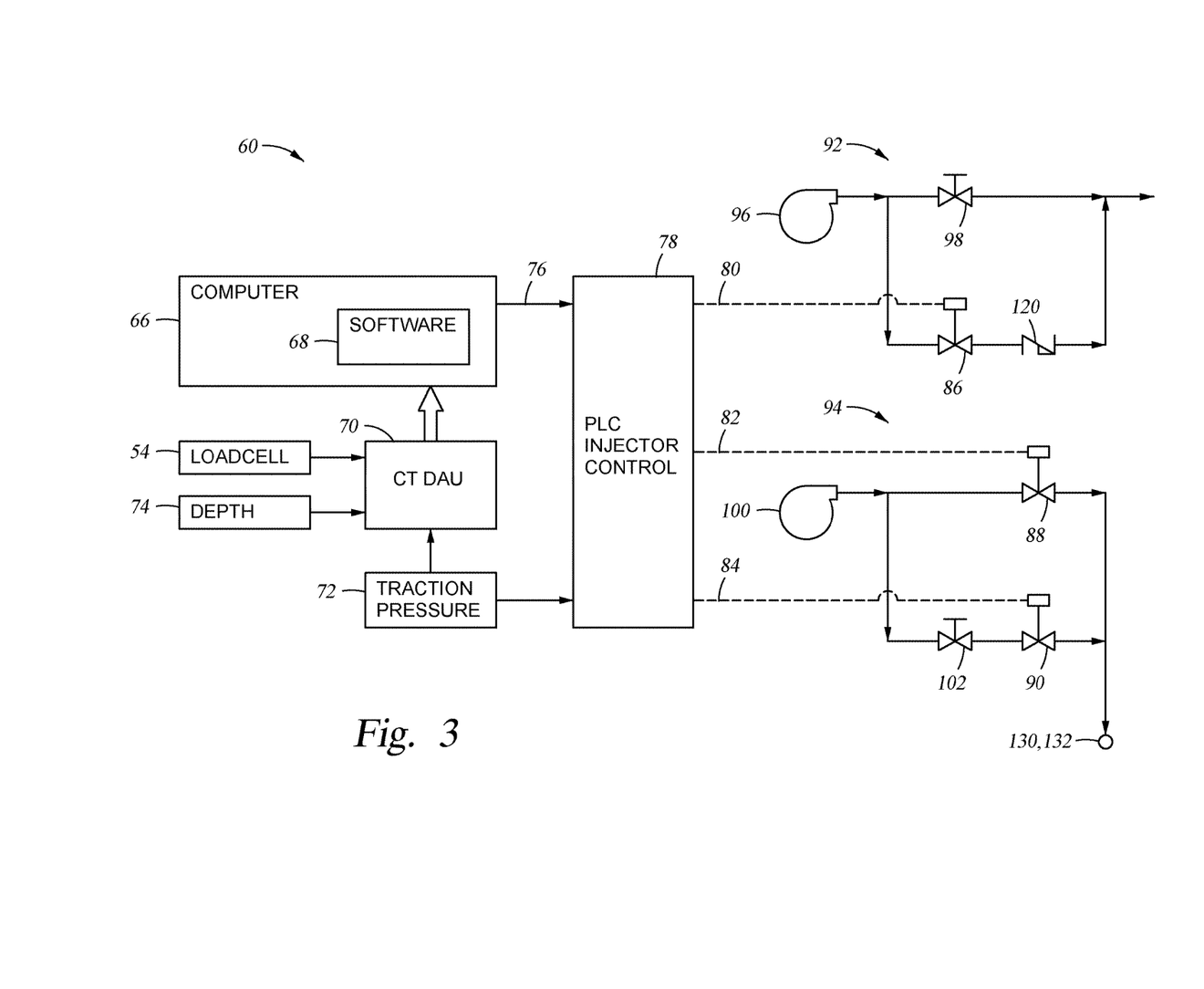
FIG. 3 depicts a schematic diagram of an embodiment of an intelligent injector control system.

With reference now to FIG. 3, one embodiment of an intelligent injector control system 60 is schematically depicted. Some components of the intelligent injector control system 60 are installed within the operators' control cabin 26 of the coiled tubing unit 10 (FIG. 1). The operator's control cabin 26 may further house a computer 66 that gathers actual operating values of a coiled tubing operation and compares the actual operating values with predicted, expected and/or desired values determined by a modeling software program 68. In one embodiment, the modeling program is CIRCA RealTime ("RT") modeling software to be installed on a CIRCA RT/Job Master computer, commercially available from Baker Hughes, Inc. The modeling software program 68 uses field data to update operational parameters in coiled tubing applications. The computer 66 may dynamically update to calculate critical variables like weight gauge limits and gooseneck pressures. The computer 66 may also provide alerts and warnings when thresholds are reached, and logs all information so it can be examined later, if needed, and provide a constant visual feed showing coiled tubing position and reel rotation. The control cabin 26 houses the hydraulic controls computer(s) 66 consoles, seating, and provides space for the customer and operator. A coiled tubing ("CT") data acquisition unit ("DAU") 70 gathers data regarding the coiled tubing 18 and the injector head 22, such data including coiled tubing weight, traction pressure, and depth of the coiled tubing 18. Data for the weight is acquired from the load cell 54. Data for traction pressure may come from a pressure transducer 72 in the hydraulic system in the cabin 26. The pressure transducer 72 determines the pressure going out to the traction cylinder 50 in the injector head 22. The depth of the coiled tubing 18 is provided by a depth sensor 74. The depth sensor 74 may be mounted in the hydraulic console of the control cabin 26 to receive readings from a tubing depth counter aligned to detect and sense a surface of the tubing 18 as the tubing 18 passes by using a mechanical digital counter or an encoder. Other means for detecting tubing depth may alternatively be incorporated. The CT DAU 70 gathers the relevant data, including sensed parameters from the load cell 54, pressure transducer 72, depth sensor 74, as well as any other data gathered from a real time coiled tubing injection operation or historical data, and provides the same to the computer 66. The modeling software program 68 is run from the computer 66, which obtains the actual operating values from the CT DAU 70 and compares the actual operating values with predicted values determined by the modeling software program 68. The comparison provides an electronic signal 76, to a programmable logic controller ("PLC") 78 (injector control module). A communication cable from the computer 66, which includes the software package 68, may connect to the PLC control box 78. The PLC 78 adjusts hydraulic pressures accordingly by sending electronic signals 80, 82, 84 to valves 86, 88, 90 within a traction pressure control hydraulic circuit 92 and a motor pressure control hydraulic circuit 94. The system 60 will take data provided by software 68 and actual real time data, such as sensed parameters from load cell 54, pressure transducer 72, and depth sensor 74, and limit operational controls of a the hydraulic coiled tubing unit 10 and limit and control hydraulic systems to improve job quality and reduce damage to the coiled tubing 18. Thus the signal 76 provided to the PLC 78 is a computed signal that takes into account the data from the predictive software 68 and the wellbore parameters and sensed parameters and other data from the coiled tubing unit 10 to control the pressures sent to the hydraulic circuit of the motors 44 to control coiled tubing injector "over pull" and "over snub" and the hydraulic circuit of the traction cylinders 50 to adjust traction pressures to active tubing weights. That is, the information from the software 68 and computer 66 will enable the making of adjustments to the pressure settings in the injector head 22 to provide proper control. This will reduce premature damage to the coiled tubing 18 from slippage, exceeding tubing calculated tensile strength ("over pull") or compression limits ("over snub").

The traction pressure control hydraulic circuit 92 and the motor pressure control hydraulic circuit 94, which will be further described below, are disposed primarily in the operators' control cabin 26 of the coiled tubing unit 10, although hydraulically connected to other areas of the coiled tubing unit 10. The traction pressure control hydraulic circuit 92, as will be further described below with respect to FIG. 4, receives pressure from hydraulic pump 96 and includes electronically controlled proportional valve 86, controlled automatically by the PLC 78, and an operator-controlled traction valve 98. The motor pressure control hydraulic circuit 94, as will be further described below with respect to FIG. 5, receives pressure from an injection hydraulic pump 100 and includes the electronically controlled proportional valve 88 and the normally open ("NO") solenoid valve 90, which are automatically controlled by the PLC 78, and an operator controlled pressure control valve 102. The power pack skid 24 may include the hydraulic pumps 96, 100. The hydraulic pressures of the traction pressure control hydraulic circuit 92 and motor pressure control hydraulic circuit will be adjusted from data from the software 68 which include actual and predicted data and comparing to actual data and hydraulic pressures to make adjustments. The PLC 78 may send a pulse width modulated ("PWM") signal 80, 82 to each of the proportional control hydraulic valves 86, 88, and these signals 80, 82 will vary to increase or decrease pressures as determined necessary by the software 68.

Figure 4:
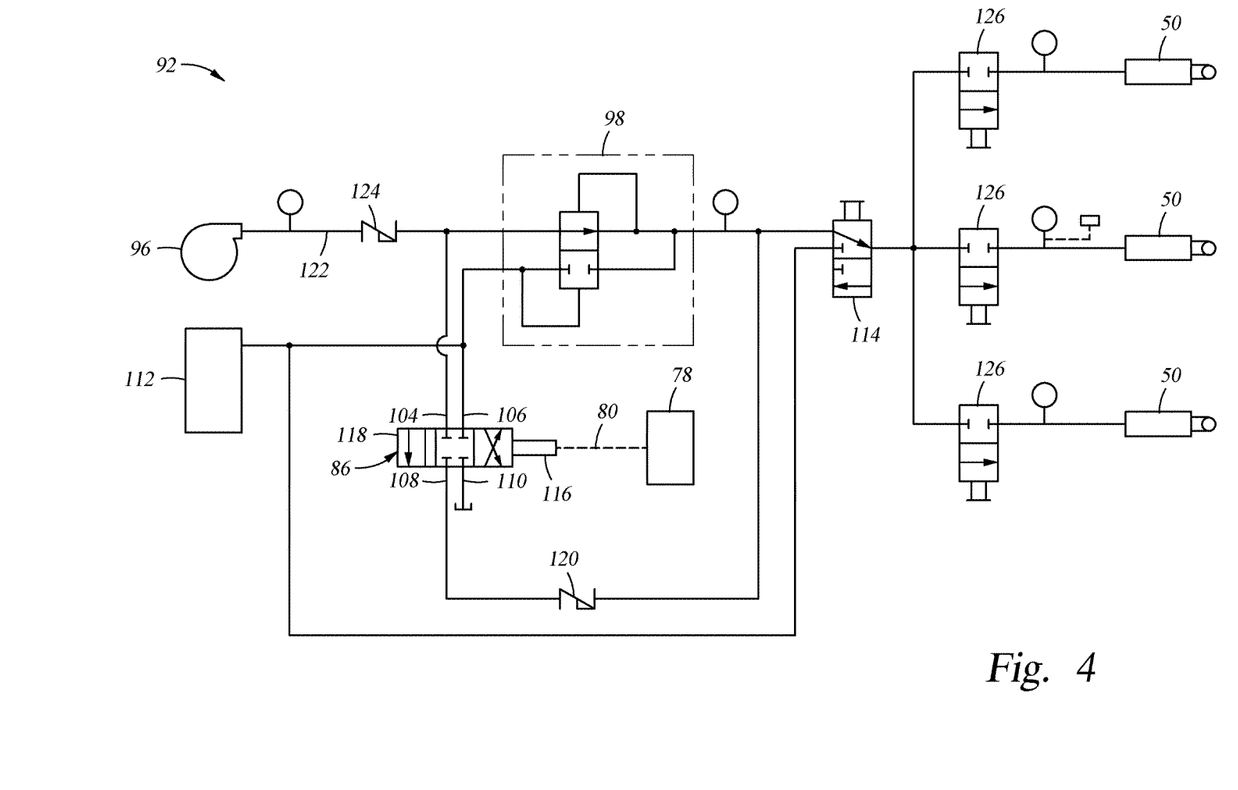
FIG. 4 depicts a hydraulic circuit diagram of an embodiment of portions of a traction pressure control hydraulic circuit; and, FIG. 5 depicts a hydraulic circuit diagram of an embodiment of portions of a motor pressure control hydraulic circuit.

FIG. 4 is a portion of a hydraulic schematic for one embodiment of the traction pressure control hydraulic circuit 92. The traction pressure control hydraulic circuit 92 includes the proportional/directional control valve 86, traction valve 98, and check valves 120, 124. Valves 86, 98 are connected in parallel. Check valve 120 is connected in series with valve 86. The electronic signal 80 to control the valve 86 comes from the PLC control box 78. The valve 86 may be a 4-port valve, where the valve 86 is illustrated in FIG. 4 in a condition where all ports are blocked. First port 104 may be connected to the pressure from pump 96, second port 106 may be connected to return 112 (return to tank), third port 108 may be connected to equalizing valve 114, and fourth port 110 may be blocked. Due to check valves 120, 124 which prevent backflow, the equalizing valve 114 is provided to drain pressure to tank in the event of an emergency. The solenoid 116 of the valve 86 receives the variable signal 80 from the PLC control box 78 to move the spool 118 relative to the ports 104, 106, 108, 110 more or less as the voltage increases and falls. Pressure is coming in on priority line 122 from pump 96 and feeds into the circuitry of the traction pressure control hydraulic circuit 92 through check valve 124, after which pressure is split to traction valve 98 and proportional control valve 86. If an operator controls the traction valve 98 to provide a traction pressure to the traction cylinder(s) 50 that is at least a minimum value or greater as determined by the computer 62 and software program 68, then the signal 80 to the valve 86 may retain the valve 86 in a condition, such as that shown in FIG. 4, in which the traction valve 98 is in control of the traction pressure and not the valve 86. However, if the operator does not adjust the traction pressure to be high enough in view of sensed parameters and predicted conditions, then the signal 80 to the valve 86 will adjust the spool 118 of the valve 86 to allow the pressure from the priority line 122 to additionally pass through the valve 86 and check valve 120 and to the traction cylinders 50, thus providing at least the minimum pressure required for the operating conditions of the coiled tubing injection operation. For example, if an operator manually backs valve 98 down to 500 psi, but the software 68 is requiring 1000 psi, then the proportional control valve 86 takes over and supplies the additional pressure. As long as the operator is running more than recommended pressure, then the operator is in control using the traction valve 98. Thai is, the operator is able to increase the pressure to the traction cylinders 50 using the traction valve 98, but cannot reduce the pressure below a minimum limit, which is warranted as necessary by the computer 66. This minimum limit may vary throughout the coiled tubing injection operation based on the data and sensed parameters. For example, at the beginning of a coiled tubing operation, there is less weight at the injector head 22 than when substantially the entire length of the coiled tubing 18 is injected into the borehole. Also, there is more weight on the injector head 22 when trying to pull all the coiled tubing 18 out of the borehole or when encountering friction lock issues, and such situations would increase the amount of traction pressure required (as the weight of the coiled tubing 18 increases, the traction pressure increases, as determined by load cell 54). Thus, the PLC 78 adjusts the signal 80 to the valve 86 throughout the coiled tubing injection operation as dictated by at least the sensed parameters. In the event of a fail mode, the circuit 92 can be taken to full hydraulic pressure to make sure the traction cylinders 50 have all the pressure required to prevent slipping. Valves 126 can adjust the pressure as required between the individual traction cylinders 50, however the pressure is usually evenly distributed to the cylinders 50.

Figure 5:
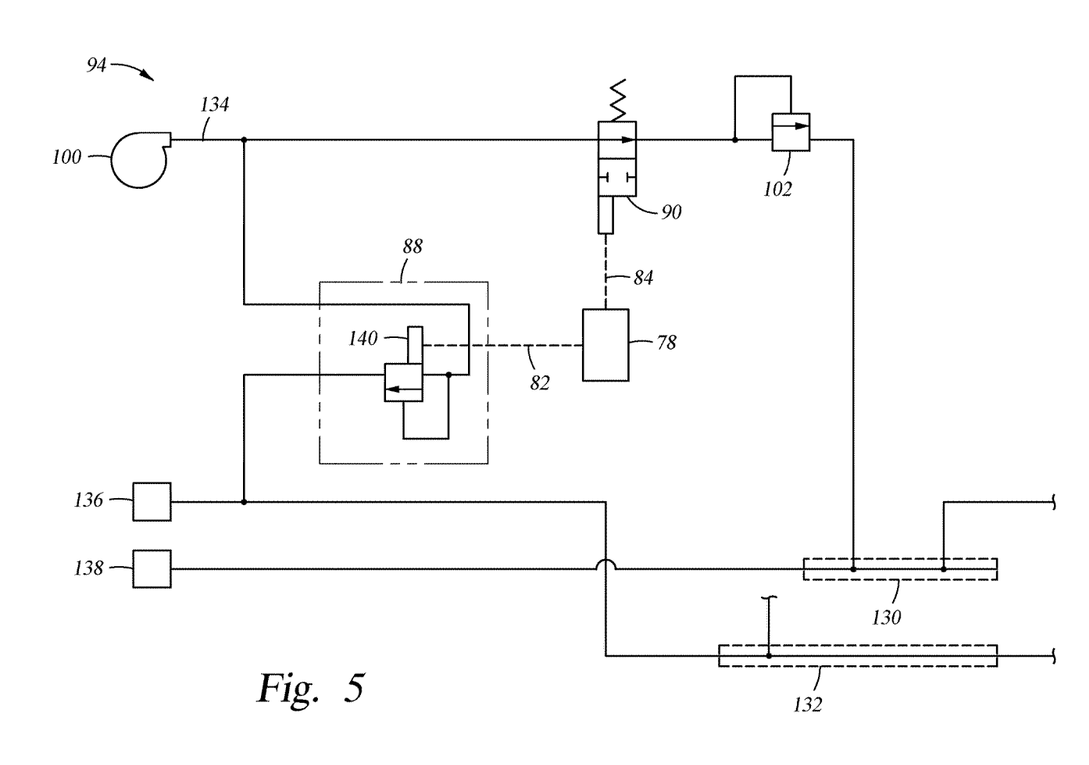

FIG. 5 is a portion of the motor pressure control hydraulic circuit 94, including the proportional control valve 88, the N/O (normally open) solenoid valve 90, and the pressure control valve 102. The electronic signals 82, 84 to control the valves 88, 90 come from the PLC 78. The motor pressure control hydraulic circuit 94 controls the amount of pressure that the injection hydraulic pump 100 provides to the motors 44 with respect to pulling and pushing the coiled tubing 18 into the well from the injection head 22. Unlike the traction pressure control hydraulic circuit 92, the motor pressure control hydraulic circuit 94 utilizes the proportional control valve 88 to entirely take over pressure to control the maximum pressure that the pump 100 can provide to the motors 44 to ensure that the maximum snub and pull limits are not exceeded by limiting hydraulic pressures allowed to be applied to the injector motors 44. As soon as the system 60 is powered up, the signal 84 to the N/O solenoid valve 90 causes the valve 90 to open such that hydraulic pressure is not fed to the operator controlled pressure control valve 102. Instead, pressure from injection hydraulic pump 100 is always adjusted as required by the proportional control valve 88, under control of the signal 82, as determined by the computer 66. If there is a failure, then the N/O solenoid valve 90 returns to the closed condition shown in FIG. 5 such that the motor pressure control hydraulic circuit 94 goes back to the manual mode with the operator controlled pressure control valve 102 receiving and adjusting the pressure from the injection hydraulic pump 100. The motor pressure control hydraulic circuit 94 adjusts electronically throughout the coiled tubing injection operation, based on data fed to PLC 78. Return manifolds 130, 132 are connected to the pressure control valve 102 and proportional control valve 88. Whatever extra volume of pressure is not needed from the hydraulic pump 100 is returned back to tank via the return manifolds 130, 132, and pressure can be dumped if it needs to be lowered or raised. The valve 88 (and the valve 102 in failure mode) pinches off the amount of flow going from the pilot pressure from pump 100. If the valve 88 is fully opened then the pressure will drop because it is depleting pressure from the tank. If the valve 88 starts pinching off then it increases pressure to what is needed. Sensed parameters including data from the load cell 54 and depth sensor 74 provide the data for the computer 66 to calculate the signal 76 to feed to the PLC 78, so that the PLC 78 will in turn tell the proportional control valve 88, via signal 82, how to adjust in order to pinch off the return to adjust to the correct amount of pressure to prevent an over snub or over pull situation. Thus, the motor pressure control hydraulic circuit 94 adjusts the pilot pressure to control the pump 100 to go to a higher pressure or lower pressure. The pump 100 and the injector directional controller (to control which direction the motors 44 move the coiled tubing 18, in hole to push the coiled tubing 18 into the well or out of hole to pull the coiled tubing 18 out) are provided in the power pack 24. The pilot line 134 provides the pressure from the injection hydraulic pump 100 in the power pack 24 to the motor pressure control hydraulic circuit 92 in the control cabin 26. The main return 136 and injector case drain 138 connect the manifolds 130, 132 in the control cabin 26 back to a return tank in the power pack 24. The manual control pressure control valve 102 is also provided inside the control cabin 26 for operation in a failure mode. In one non-limiting example, the proportional control valve 88, which is used to control the pressure proportionally, receives a 4-20 milliamp signal 82 on solenoid 140, with 4 millamps providing 0 psi, and 20 millamps giving approximately 3,000 psi.

The system 60 uses the software program 68 and allows automatic control of traction pressures and limits maximum torque pressure to injector hydraulics. By controlling these pressures, coiled tubing life can be increased by limiting slippage, over-pull, and over-snub. This also improves job quality and lowers non-productive time due to unmitigated risks, equipment stress and damage. With the intelligent injector control system, operator interface is limited on three main control issues, which have historically been issues, since the system 60 will auto control these circuits. Adjusting throughout the coiled tubing injection operation is possible because of the software 68, and the system 60 is able to track and make modifications throughout the operation.

The intelligent injector control system 60 utilizes at least the sensed parameters and may additionally use other data from a coiled tubing injection operation, and the system 60 additionally incorporates unique hydraulic circuitry to control pull limits and push limits during the duration of the operation which is being predicted by the software 68 based from engineering inputs of equipment information and well information to automatically adjust or vary as equipment and well bore changes take place. The intelligent injector control system 60 also utilizes the data and its hydraulic circuitry to vary traction pressures on the injector head 22 as tubing weight conditions change for the duration of the operation and reacts as changes occur.

Thus, the intelligent injector control system 60 is part of the oilfield services coiled tubing unit 10. The system 60 works with the software 68 to reduce damages to the coiled tubing 18 by controlling hydraulic controls to limit maximum snub and pull limits in the motor pressure control hydraulic circuit 94 as well as minimum traction pressures in the traction control hydraulic circuit 92. The software 68 considers the condition of the coiled tubing 18 and considers well conditions to predict minimum and maximum settings of the controls. The intelligent injector control system 60 gathers the actual hydraulic pressure data, compares it with the predicted limits as sent from the program 68 and adjusts the hydraulic system to meet these limits. The PLC control box 78 is then connected to two valves 86, 88 which can control pressure and a N/O solenoid valve 90, which directs flow from a manual valve 102 to the electronic proportional valve 88. The electronic proportional valves 86, 88, once energized, will then take control and adjust pressures to the traction cylinders 50 and the injector hydraulic pump 100. The intelligent injector control system 60 limits the hydraulic pressures allowed to be applied to the injector head motor circuit as well as sets the minimum pressure allowed to the traction cylinder circuit. By controlling the pressures to the injector motor circuit, an operator cannot damage the tubing 18 by exceeding its snub or pull limit, which could cause the coiled tubing 18 to become buckled or parted from tensile strength. By controlling the minimum traction pressure, the system 60 will not allow an operator to have the pressure for the traction cylinders 50 set too low, which might allow the coiled tubing 18 to slip and cause damage to the coiled tubing 18 as well as create a runaway scenario resulting in catastrophic damage to the coiled tubing 18.

Set forth below are some embodiments of the foregoing disclosure:

Embodiment 1: An injector control system for a coiled tubing unit, the injector control system comprising: a programmable logic controller arranged to receive a signal related to sensed parameters of a coiled tubing injection operation; a traction pressure control hydraulic circuit operable to adjust hydraulic pressure provided to at least one traction cylinder in a coiled tubing injection head; a motor pressure control hydraulic circuit operable to adjust hydraulic pressure provided to at least one motor of the coiled tubing injection head; and, at least one of the traction pressure control hydraulic circuit and the motor pressure control hydraulic circuit including a proportional control valve in receipt of a variable electrical signal from the programmable logic controller; wherein the programmable logic controller adjusts the signal delivered to the proportional control valve throughout the coiled tubing injection operation as dictated by the sensed parameters.

Embodiment 2: The injector control system of embodiment 1, wherein the traction pressure control hydraulic circuit includes a traction valve controllable by operator input and the proportional control valve in receipt of the signal from the programmable logic controller, and the signal from the programmable logic controller operates the proportional control valve to prevent the traction valve from providing hydraulic pressure to the at least one traction cylinder that is lower than a minimum value required by the coiled tubing injection operation.

Embodiment 3: The injector control system of embodiment 2, wherein the proportional control valve is a four-port valve having a solenoid in receipt of the signal from the programmable logic controller and a movable spool.

Embodiment 4: The injector control system of embodiment 2, further comprising a hydraulic pump, wherein hydraulic pressure to the traction control circuit from the hydraulic pump is deliverable to both the traction valve and the proportional control valve in the traction control circuit.

Embodiment 5: The injector control system of embodiment 4, wherein the proportional control valve in the traction control circuit and the traction valve are connected in parallel.

Embodiment 6: The injector control system of embodiment 5, further comprising a check valve disposed in series with the proportional control valve in the traction control circuit and in parallel with the traction valve.

Embodiment 7: The injector control system of embodiment 1, wherein the motor pressure control hydraulic circuit includes the proportional control valve in receipt of the signal from the programmable logic controller, the signal from the programmable logic controller is a first signal operating the proportional control valve to adjust the hydraulic pressure as required by the coiled tubing injection operation.

Embodiment 8: The injector control system of embodiment 7, wherein the motor pressure control hydraulic circuit further includes a normally open solenoid valve, and further comprising a second signal from the programmable logic controller to open the normally open solenoid valve.

Embodiment 9: The injector control system of embodiment 8, wherein the motor pressure control hydraulic circuit further includes an operator-controlled pressure control valve in series with the normally open solenoid valve, wherein the pressure control valve is only operable when the second signal is removed from the normally open solenoid valve.

Embodiment 10: The injector control system of embodiment 1, wherein the traction pressure control hydraulic circuit includes a first proportional control valve in receipt of a first signal from the programmable logic controller, and the motor pressure control hydraulic circuit includes a second proportional control valve in receipt of a second signal from the programmable logic controller.

Embodiment 11: The injector control system of embodiment 10, wherein the first signal operates the first proportional control valve to prevent an operator-controlled traction valve from delivering hydraulic pressure to the at least one traction cylinder that is lower than a minimum value required by the coiled tubing injection operation, and the second signal operates the second proportional control valve to adjust the hydraulic pressure provided to the at least one motor as required by the coiled tubing injection operation.

Embodiment 12: The injector control system of embodiment 11, further comprising a third signal from the programmable logic controller to open a normally open solenoid valve in the motor pressure control hydraulic circuit, and an operator-controlled pressure control valve in series with the normally open solenoid valve, wherein the pressure control valve is only operable when the third signal is removed from the normally open solenoid valve.

Embodiment 13: The injector control system of embodiment 1, further comprising a load cell, pressure transducer, and depth sensor providing data for the sensed parameters.

Embodiment 14: The injector control system of embodiment 13, further comprising a data acquisition unit arranged to receive the data from the load cell, pressure transducer, and depth sensor, and further comprising a computer having a modeling software program in receipt of the data, wherein the computer sends a signal to the programmable logic controller in response to the data, and the programmable logic controller utilizes the signal from the computer to vary the signal delivered to the proportional control valve.

Embodiment 15: The injector control system of claim 14, wherein the modeling software program compares the data with predicted parameters of the coiled tubing injection operation.

Embodiment 16: A coiled tubing unit having the injector control system of embodiment 1, the coiled tubing unit further comprising the coiled tubing unit injection head including the at least one traction cylinder and the at least one motor, and further comprising a control cabin housing the programmable logic controller, the traction control hydraulic circuit, and the motor pressure control hydraulic circuit.

Embodiment 17: A method of adjusting hydraulic pressure delivered to an injection head of a coiled tubing unit, the coiled tubing unit including a traction pressure control hydraulic circuit operable to adjust hydraulic pressure provided to at least one traction cylinder in the injection head, the coiled tubing unit further including a motor pressure control hydraulic circuit operable to adjust hydraulic pressure provided to at least one motor of the injection head, the method comprising: providing sensed parameters of a coiled tubing injection operation to a computer; sending a computed signal based on the sensed parameters from the computer to a programmable logic controller; and, varying a signal from the programmable logic controller to a proportional control valve in at least one of the traction pressure control hydraulic circuit and the motor pressure control hydraulic circuit based on the computed signal from the computer; wherein hydraulic pressure to the injection head is adjusted substantially continuously during the coiled tubing unit injection operation by at least one of the traction pressure control hydraulic circuit and the motor pressure control hydraulic circuit.

Embodiment 18: The method of embodiment 17, further comprising comparing the sensed parameters with a second set of parameters in the computer to provide the computed signal.

Embodiment 19: The method of embodiment 17, wherein the traction pressure control hydraulic circuit includes a traction valve controllable by operator input and the proportional control valve in receipt of the signal from the programmable logic controller, the method further comprising operating the proportional control valve with the signal from the programmable logic controller to prevent the traction valve from delivering hydraulic pressure that is lower than a minimum value required by the coiled tubing unit injection operation as determined by the computed signal.

Embodiment 20: The method of embodiment 17, wherein the motor pressure control hydraulic circuit includes the proportional control valve in receipt of the signal from the programmable logic controller, the method further comprising operating the proportional control valve using the signal from the programmable logic controller to adjust the hydraulic pressure as required by the coiled tubing unit injection operation as determined by the computed signal.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An injector control system for a coiled tubing unit, the injector control system comprising:
   a programmable logic controller arranged to receive a signal related to sensed parameters of a coiled tubing injection operation;
   a traction pressure control hydraulic circuit operable to adjust hydraulic pressure provided to at least one traction cylinder in a coiled tubing injection head, the traction pressure control hydraulic circuit including a first proportional control valve in receipt of a first signal from the programmable logic controller; and
   a motor pressure control hydraulic circuit operable to adjust hydraulic pressure provided to at least one motor of the coiled tubing injection head, the motor pressure control hydraulic circuit including a second proportional control valve in receipt of a second signal from the programmable logic controller;
   wherein the first signal operates the first proportional control valve to prevent an operator-controlled traction valve from delivering hydraulic pressure to the at least one traction cylinder that is lower than a minimum value required by the coiled tubing injection operation, and the second signal operates the second proportional control valve to adjust the hydraulic pressure provided to the at least one motor as required by the coiled tubing injection operation, and the programmable logic controller adjusts the first and second signals delivered to the first and second proportional control valves throughout the coiled tubing injection operation as dictated by the sensed parameters.

2. The injector control system of claim 1, further comprising a third signal from the programmable logic controller to open a normally open solenoid valve in the motor pressure control hydraulic circuit, and an operator-controlled pressure control valve in series with the normally open solenoid valve, wherein the pressure control valve is only operable when the third signal is removed from the normally open solenoid valve.

3. The injector control system of claim 1, further comprising a load cell, pressure transducer, and depth sensor providing data for the sensed parameters.

4. The injector control system of claim 3, further comprising a data acquisition unit arranged to receive the data from the load cell, pressure transducer, and depth sensor.

5. An injector control system for a coiled tubing unit, the injector control system comprising:
   a programmable logic controller arranged to receive a signal related to sensed parameters of a coiled tubing injection operation;
   a traction pressure control hydraulic circuit operable to adjust hydraulic pressure provided to at least one traction cylinder in a coiled tubing injection head, the traction pressure control hydraulic circuit including a traction valve controllable by operator input and a proportional control valve in receipt of a variable electrical signal from the programmable logic controller, and the variable electrical signal from the programmable logic controller operates the proportional control valve to prevent the traction valve from providing hydraulic pressure to the at least one traction cylinder that is lower than a minimum value required by the coiled tubing injection operation; and
   a motor pressure control hydraulic circuit operable to adjust hydraulic pressure provided to at least one motor of the coiled tubing injection head;
   wherein the programmable logic controller adjusts the signal delivered to the proportional control valve throughout the coiled tubing injection operation as dictated by the sensed parameters.

6. The injector control system of claim 5, wherein the proportional control valve is a four-port valve having a solenoid in receipt of the signal from the programmable logic controller and a movable spool.

7. The injector control system of claim 5, further comprising a hydraulic pump, wherein hydraulic pressure to the traction control circuit from the hydraulic pump is deliverable to both the traction valve and the proportional control valve in the traction control circuit.

8. The injector control system of claim 7, wherein the proportional control valve in the traction control circuit and the traction valve are connected in parallel.

9. The injector control system of claim 8, further comprising a check valve disposed in series with the proportional control valve in the traction control circuit and in parallel with the traction valve.

10. The injector control system of claim 5, wherein the variable electrical signal is a first signal and the proportional control valve is a first proportional control valve, and the motor pressure control hydraulic circuit includes a second proportional control valve in receipt of a second signal from the programmable logic controller, the second signal from the programmable logic controller operates the second proportional control valve to adjust the hydraulic pressure as required by the coiled tubing injection operation.

11. An injector control system for a coiled tubing unit, the injector control system comprising:
   a programmable logic controller arranged to receive a signal related to sensed parameters of a coiled tubing injection operation;
   a traction pressure control hydraulic circuit operable to adjust hydraulic pressure provided to at least one traction cylinder in a coiled tubing injection head; and
   a motor pressure control hydraulic circuit operable to adjust hydraulic pressure provided to at least one motor of the coiled tubing injection head, the motor pressure control hydraulic circuit including a proportional control valve in receipt of a variable electrical signal from the programmable logic controller;
   wherein the programmable logic controller adjusts the signal delivered to the proportional control valve throughout the coiled tubing injection operation as dictated by the sensed parameters, the signal from the programmable logic controller is a first signal operating the proportional control valve to adjust the hydraulic pressure as required by the coiled tubing injection operation, the motor pressure control hydraulic circuit further including a normally open solenoid valve, and further comprising a second signal from the programmable logic controller to open the normally open solenoid valve.

12. The injector control system of claim 11, wherein the motor pressure control hydraulic circuit further includes an operator-controlled pressure control valve in series with the normally open solenoid valve, wherein the pressure control valve is only operable when the second signal is removed from the normally open solenoid valve.

13. A coiled tubing unit having the injector control system of claim 1, the coiled tubing unit further comprising the coiled tubing unit injection head including the at least one traction cylinder and the at least one motor, and further comprising a control cabin housing the programmable logic controller, the traction control hydraulic circuit, and the motor pressure control hydraulic circuit.

14. A method of adjusting hydraulic pressure delivered to an injection head of the coiled tubing unit having the injector control system of claim 1, the method comprising:
providing the sensed parameters of the coiled tubing injection operation to a computer;
sending the signal based on the sensed parameters as a computed signal from the computer to the programmable logic controller; and,
varying the signal from the programmable logic controller to the first and second proportional control valves based on the computed signal from the computer;
wherein hydraulic pressure to the injection head is adjusted during the coiled tubing unit injection operation by the traction pressure control hydraulic circuit and the motor pressure control hydraulic circuit.

15. The method of claim 14, further comprising comparing the sensed parameters with a second set of parameters in the computer to provide the computed signal.

16. The method of claim 14, further comprising operating the first proportional control valve with the first signal from the programmable logic controller to prevent the traction valve from delivering hydraulic pressure that is lower than a minimum value required by the coiled tubing unit injection operation as determined by the computed signal.

17. The method of claim 14, further comprising operating the second proportional control valve using the second signal from the programmable logic controller to adjust the hydraulic pressure as required by the coiled tubing unit injection operation as determined by the computed signal.

* * * * *